US012638994B2

(12) United States Patent
Helmick

(10) Patent No.: US 12,638,994 B2
(45) Date of Patent: May 26, 2026

(54) SYSTEMS AND METHODS OF MULTI-PORT STORAGE DEVICES

(71) Applicant: Samsung Electronics Co., Ltd., Suwon-si (KR)

(72) Inventor: Daniel Lee Helmick, Thornton, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/737,947

(22) Filed: Jun. 7, 2024

(65) Prior Publication Data
US 2025/0321689 A1     Oct. 16, 2025

Related U.S. Application Data

(60) Provisional application No. 63/634,919, filed on Apr. 16, 2024.

(51) Int. Cl.
*G06F 3/06* (2006.01)

(52) U.S. Cl.
CPC .......... *G06F 3/0635* (2013.01); *G06F 3/0614* (2013.01); *G06F 3/0679* (2013.01)

(58) Field of Classification Search
CPC ..... G06F 3/0635; G06F 3/0614; G06F 3/0679
See application file for complete search history.

(56) References Cited

U.S. PATENT DOCUMENTS

| | | | |
|---|---|---|---|
| 7,752,385 | B2 | 7/2010 | Elliott et al. |
| 8,909,980 | B1 | 12/2014 | Lewis et al. |
| 9,887,008 | B2 | 2/2018 | Lee et al. |
| 10,534,733 | B2 | 1/2020 | O'Brien, III et al. |
| 10,540,185 | B1 | 1/2020 | Harris et al. |
| 10,713,203 | B2 | 7/2020 | Bai et al. |
| 11,194,750 | B2 | 12/2021 | Maroney et al. |
| 11,573,917 | B2 | 2/2023 | Long |
| 11,777,804 | B2 | 10/2023 | L'Ecuyer et al. |
| 2019/0227714 | A1* | 7/2019 | Duncan .................. G06F 3/0659 |
| 2021/0374079 | A1* | 12/2021 | Shin ...................... G06F 13/382 |
| 2022/0382696 | A1* | 12/2022 | Jeon ..................... G06F 13/4221 |

(Continued)

FOREIGN PATENT DOCUMENTS

| | | |
|---|---|---|
| CN | 107219899 A | 9/2017 |
| CN | 116185641 B | 8/2023 |

(Continued)

*Primary Examiner* — Francisco A Grullon
(74) *Attorney, Agent, or Firm* — Renaissance IP Law Group LLP

(57) ABSTRACT

Provided are systems, methods, and apparatuses for systems and methods of multi-port storage devices. In one or more examples, the systems, devices, and methods including configuring a storage device with at least a first port, a second port, and a third port; establishing a first connection between a first processing unit and the storage device via the third port that is different from a second connection to the storage device via the first port or a third connection to the storage device via the second port; performing a data operation on the storage device based on the first connection; and maintaining a first quality of service for the first connection different from a second quality of service for the second connection.

20 Claims, 8 Drawing Sheets

(56)                    References Cited

U.S. PATENT DOCUMENTS

| | | | | |
|---|---|---|---|---|
| 2023/0185475 A1* | 6/2023 | Segev | .................. | G06F 3/0613 |
| | | | | 710/33 |
| 2023/0315344 A1* | 10/2023 | Klein | .................. | G06F 3/0638 |
| | | | | 711/154 |
| 2023/0393877 A1* | 12/2023 | Maroney | .............. | G06F 3/0664 |

FOREIGN PATENT DOCUMENTS

| | | |
|---|---|---|
| CN | 116627880 B | 1/2024 |
| WO | 02071233 A3 | 9/2002 |

* cited by examiner

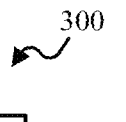
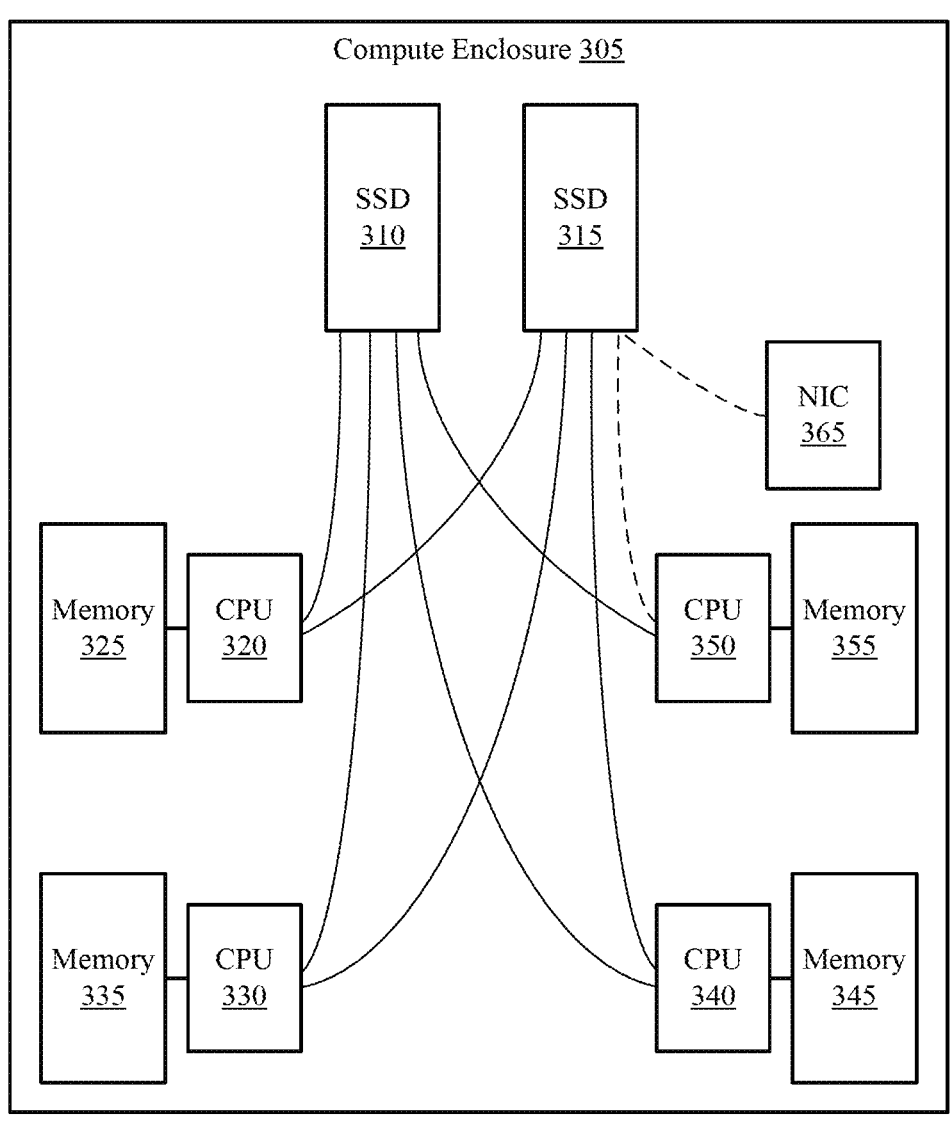
FIG. 3

400

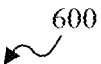

600

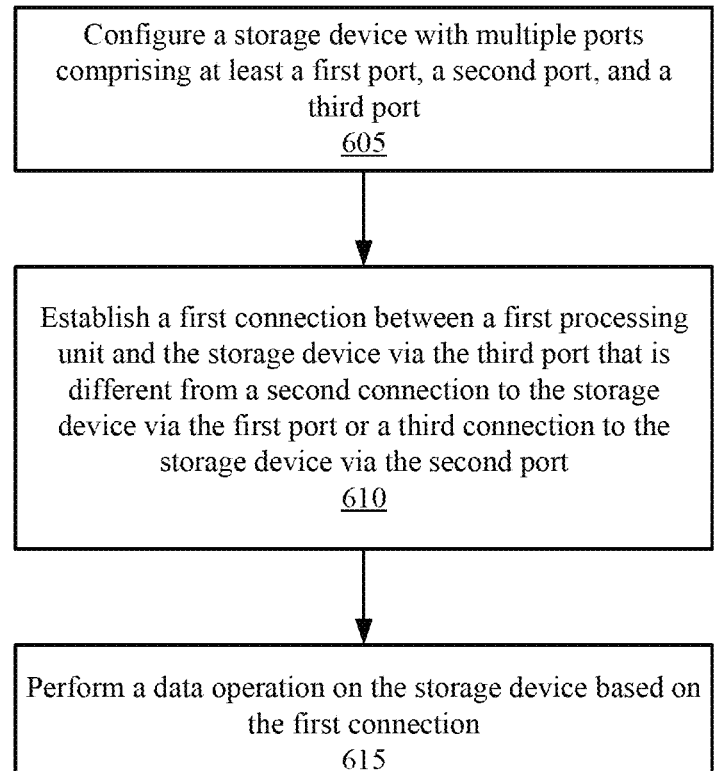

Configure a storage device with multiple ports comprising at least a first port, a second port, and a third port
605

Establish a first connection between a first processing unit and the storage device via the third port that is different from a second connection to the storage device via the first port or a third connection to the storage device via the second port
610

Perform a data operation on the storage device based on the first connection
615

FIG. 6

700

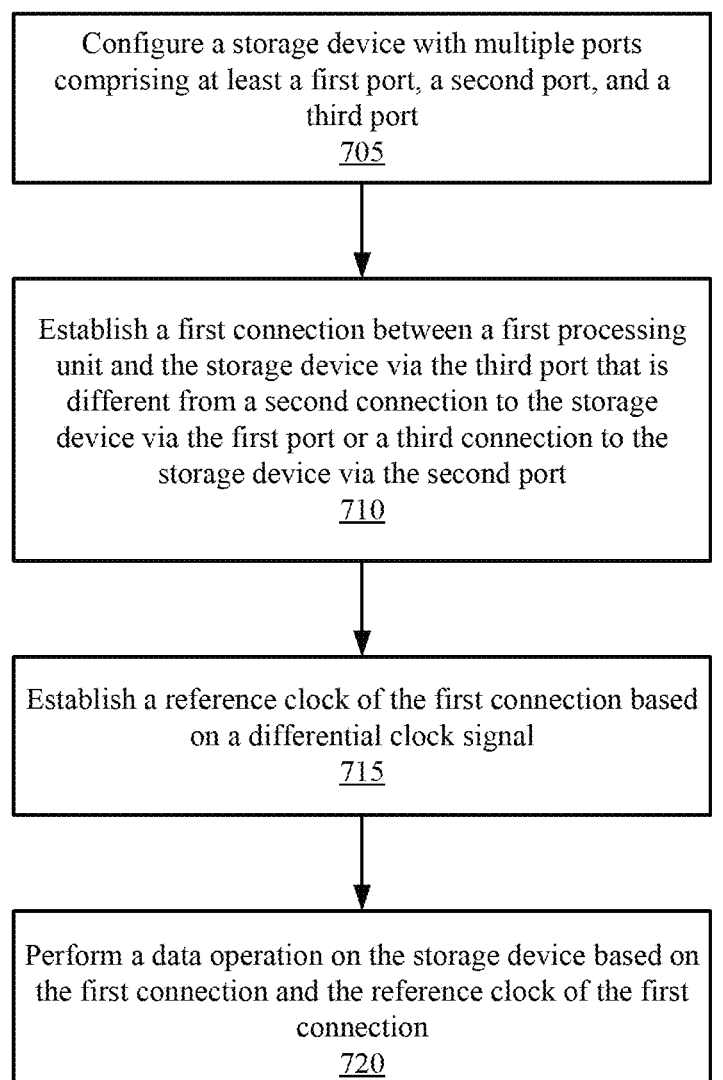

Configure a storage device with multiple ports comprising at least a first port, a second port, and a third port
705

Establish a first connection between a first processing unit and the storage device via the third port that is different from a second connection to the storage device via the first port or a third connection to the storage device via the second port
710

Establish a reference clock of the first connection based on a differential clock signal
715

Perform a data operation on the storage device based on the first connection and the reference clock of the first connection
720

FIG. 7

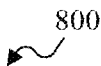
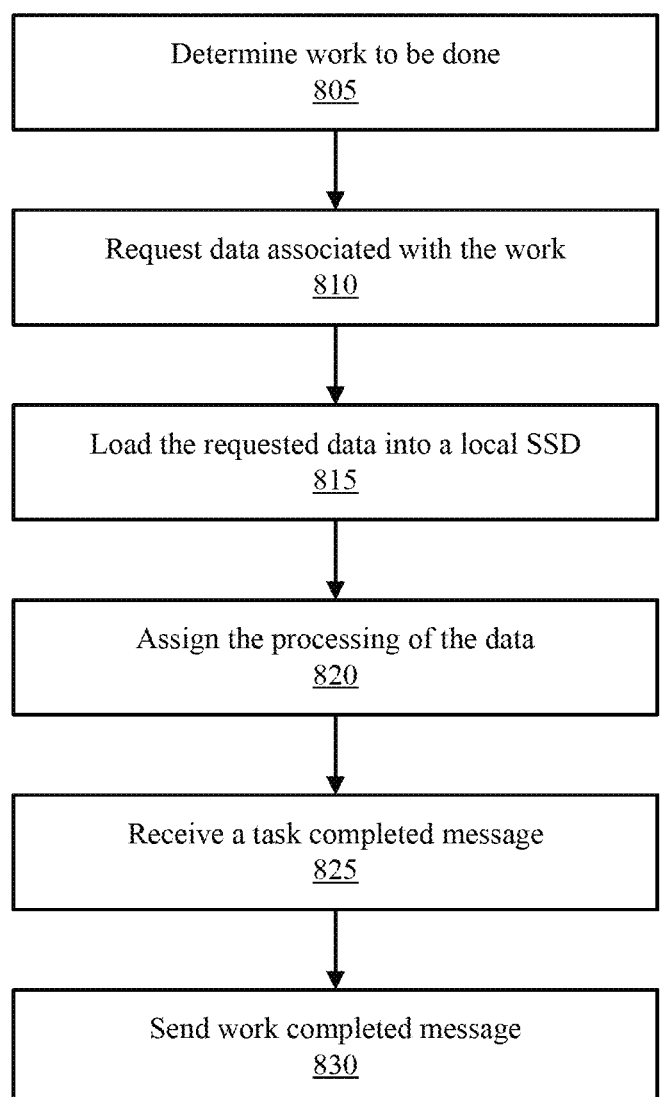
Determine work to be done
805
Request data associated with the work
810
Load the requested data into a local SSD
815
Assign the processing of the data
820
Receive a task completed message
825
Send work completed message
830
FIG. 8

SYSTEMS AND METHODS OF MULTI-PORT STORAGE DEVICES

CROSS-REFERENCE TO RELATED APPLICATIONS

This application claims the benefit of U.S. Provisional Patent Application Ser. No. 63/634,919, filed Apr. 16, 2024, which is incorporated by reference herein for all purposes.

TECHNICAL FIELD

The disclosure relates generally to memory systems, and more particularly to systems and methods of multi-port storage devices.

BACKGROUND

The present background section is intended to provide context only, and the disclosure of any concept in this section does not constitute an admission that said concept is prior art.

Cloud computing is the delivery of computing services over the internet. These services include servers, storage, databases, networking, software, analytics, and intelligence. Cloud storage allows users to save files on third-party servers that can be accessed from the internet at any time. Multitenancy can include several cloud customers accessing the same computing resources, such as when several companies are storing data on the same physical server.

SUMMARY

In various embodiments, the systems and methods described herein include systems, methods, and apparatuses for systems and methods of multi-port storage devices (e.g., four-port storage devices). In some aspects, the systems and methods described herein relate to a method including: configuring a storage device with at least a first port, a second port, and a third port; establishing a first connection between a first processing unit and the storage device via the third port that is different from a second connection to the storage device via the first port or a third connection to the storage device via the second port; performing a data operation on the storage device based on the first connection; and maintaining a first quality of service for the first connection different from a second quality of service for the second connection.

In some aspects, the techniques described herein relate to a method, further including rerouting traffic associated with the first port to at least the second port or the third port based on detecting a failure at the first port.

In some aspects, the techniques described herein relate to a method, further including maintaining the first quality of service of the first connection on at least the second port or the third port based on rerouting the traffic associated with the first port to at least the second port or the third port.

In some aspects, the techniques described herein relate to a method, wherein: the first port connects to a first reset connector pin and a first pair of differential clock connector pins, the second port connects to a second reset connector pin and a second pair of differential clock connector pins, and the third port connects to a third reset connector pin and a third pair of differential clock connector pins.

In some aspects, the techniques described herein relate to a method, wherein the first reset connector pin and the pair of differential clock connector pins are configured based on a peripheral component interconnect express form factor.

In some aspects, the techniques described herein relate to a method, wherein: the third port of the storage device is communicatively coupled to a first switch, and the first switch is communicatively coupled to the first processing unit.

In some aspects, the techniques described herein relate to a method, wherein the first switch is communicatively coupled to a second processing unit.

In some aspects, the techniques described herein relate to a method, wherein the first processing unit is a first type of processing unit and the second processing unit is a second type of processing unit.

In some aspects, the techniques described herein relate to a method, wherein the first type of processing unit includes a central processing unit and the second type of processing unit includes a graphical processing unit.

In some aspects, the techniques described herein relate to a method, wherein the first switch connects to a graphical processing unit cluster, the graphical processing unit cluster including the graphical processing unit.

In some aspects, the techniques described herein relate to a method, wherein the first switch includes a transmission control protocol/internet protocol (TCP/IP) switch.

In some aspects, the techniques described herein relate to a method, wherein the first port is communicatively coupled to a second switch and the second port is communicatively coupled to a third switch.

In some aspects, the techniques described herein relate to a method, wherein the first switch, the second switch, and the third switch are in an enclosure with the storage device.

In some aspects, the techniques described herein relate to a method, further including performing a communication protocol to establish a fourth connection that initiates at a fourth port and terminates at a fourth processing unit.

In some aspects, the techniques described herein relate to a method, wherein the fourth port is configured as a failover port for at least one of the first port, the second port, or the third port based on a failure detected with at least one of the first port, the second port, or the third port.

In some aspects, the techniques described herein relate to a method, wherein the data operation includes at least one of read access, write access, modify access, copy access, deallocation access, or garbage collection access.

In some aspects, the techniques described herein relate to a storage device including: at least a first port, a second port, and a third port, the storage device being configured to: establish a first connection between a first processing unit and the storage device via the third port that is different from a second connection to the storage device via the first port or a third connection to the storage device via the second port; perform a data operation on the storage device based on the first connection; and maintain a first quality of service for the first connection different from a second quality of service for the second connection.

In some aspects, the techniques described herein relate to a storage device, further including rerouting traffic associated with the first port to at least the second port or the third port based on detecting a failure at the first port.

In some aspects, the techniques described herein relate to a non-transitory computer-readable medium storing code that includes instructions executable by a processor of a storage device with at least a first port, a second port, and a third port, the instructions executable by the processor to: establish a first connection between a first processing unit and the storage device via the third port that is different from a second connection to the storage device via the first port or a third connection to the storage device via the second port; perform a data operation on the storage device based on the first connection; and maintain a first quality of service for the first connection different from a second quality of service for the second connection.

In some aspects, the techniques described herein relate to a non-transitory computer-readable medium, the instructions being executable by the processor to reroute traffic associated with the first port to at least the second port or the third port based on detecting a failure at the first port.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, the systems and methods provide a low latency computing architecture. Also, the systems and methods increase the connectivity of a given storage device (e.g., solid-state drive (SSD)) rather than enclosure level changes for improved connectivity. Additionally, the systems and methods minimize or remove the need for network adapters, switches, relays, and/or repeaters. The systems and methods include dynamic partition of peripheral component interconnect express (PCIe) disk arrays based on software configuration and/or policy distribution, improving system functionality and system efficiency. The systems and methods can include software configuration changes in place of hardware changes to increase physical connection options.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 3 illustrates an example system in accordance with one or more implementations as described herein.

FIG. 6 depicts a flow diagram illustrating an example method associated with the disclosed systems, in accordance with example implementations described herein.

FIG. 7 depicts a flow diagram illustrating an example method associated with the disclosed systems, in accordance with example implementations described herein.

FIG. 8 depicts a flow diagram illustrating an example method associated with the disclosed systems, in accordance with example implementations described herein.

Figure 1:
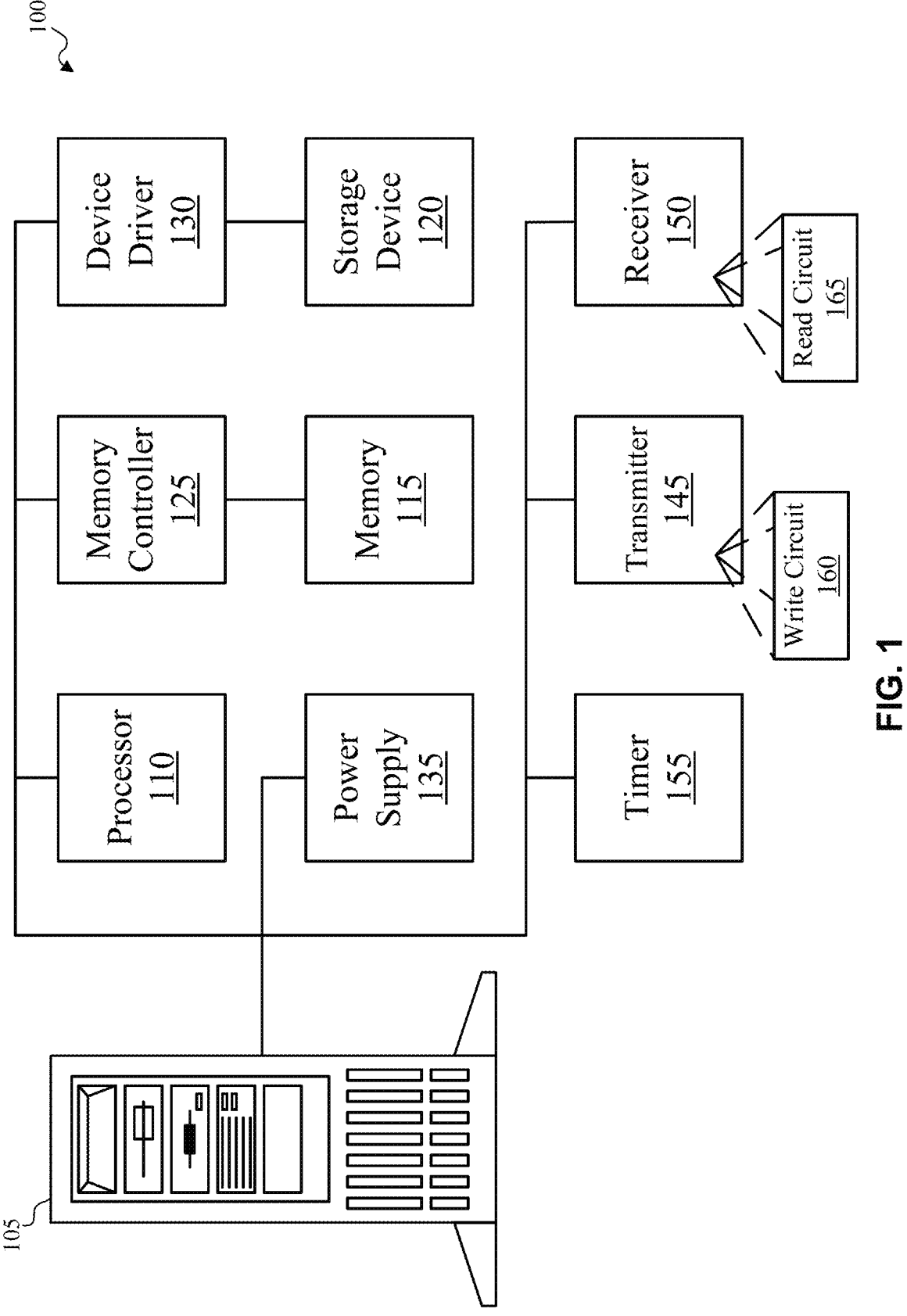
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof. Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

In some systems, a single port storage device may be used for ease of use, where the drive may be plugged into one processor and accessed accordingly. Access to the drive from other host processors may be through the processor connected to the drive. In some systems, dual port storage may be used to enable secondary access to a given drive. Dual port storage can be used in active-active or active-passive mode. In active-passive mode, the dual port storage can enable a more robust drive access in the case of a failed link on one of the ports. The passive port may become active when the active port or a component associated with the upstream active port fails. In active-active mode, multi-port storage can enable multiple host processors access to a drive (e.g., direct, simultaneous access to the drive) without any additional components (e.g., via a switch or going through another host processor), In active-active mode, the multi-port storage can enable host processors access to a drive without latency delays through intermediary components. In active-active mode, the dual port storage can enable host processors access to a drive while reducing total interconnects in a system that includes several intercommunicating components (e.g., multiple components simultaneously attempting to intercommunicate).

The systems and methods may provide a failover mechanism based on a detected failure of a port. A port of a storage device may be recognized as non-responsive for any number of potential reasons. For example, Signal Integrity is distorting the signal such that transmissions are not successful across the link. Perhaps the enterprise PCIe Reset (ePERST) voltage may be lost and then the port is no longer recognized as connected. In some cases, one of the ports may be turned off or put into a lower power state. When this occurs, commands that the host CPU would have routed into the failed port may be re-routed by the host into another port of that storage device. The other port may be referred to as the failover port. In some cases, a failover port may be a port held idle for such a situation (e.g., idle failover port). In some cases, the failover port may be active and may be used when another port fails. Upon detecting the failed port, the host may switch commands from the failed port to the active port (e.g., active failover port). Additionally, or alternatively, when port0 fails on a storage device, the host may reroute traffic for port0 at least a second port of the storage device. For example, the host may spread the activity of port0 to port1 and port2, or to port1, port2, and port3, etc., rather than rerouting all port0 traffic to a single failover port. In some cases, traffic on port0 may include at least a first QoS, traffic on port1 may include at least a second QoS different from the first QoS. When traffic of port0 is rerouted to at least a second port (e.g., port1, port2, and/or port3), the first QoS for traffic on port0 may be maintained. In some examples, a first tenant on port0 may have a first tenant QoS, a second tenant on port0 may have a second tenant QoS different from the first tenant QoS, and based on the failover rerouting, each respective QoS may be maintained on the failover port or failover ports.

Peripheral component interconnect express (PCIe) is a standardized interface that allows for high-speed data transfer between electronic components. Non-volatile memory express (NVMe) is a protocol that connects solid-state drive (SSD) storage to CPUs or servers using the PCIe bus.

PCIe generation 6 (PCIe 6.0) is a relatively fast PCIe link with a relatively extreme amount of bandwidth available for accessing a storage device. It may be unlikely that a current processor could issue enough commands or input/output (I/O) to fill a PCIe 6.0 1×4 link while also reserving enough compute capacity to perform other useful system work. Two lanes or one lane of PCIe 6.0 may be sufficient for some use-cases where the host is using a processor for non-storage focused tasks. PCIe 1×4 may refer to a device (e.g., storage device, SSD) configured with one port that includes four lanes (e.g., four data communication lanes). PCIe 1×8 may refer to a device (e.g., storage device, SSD) configured with one port that includes eight lanes (e.g., eight data communication lanes). PCIe 4×1 may refer to a device (e.g., storage device, SSD) configured with four ports, where each port includes one lane for data communication. PCIe 8×1 may refer to a device (e.g., storage device, SSD) configured with eight ports, where each port includes one lane for data communication. In some cases, lanes may be configured with bifurcation. In an example, host processor lanes may be split into groupings (e.g., based on bifurcation listings indicating available lane groupings). As an example, a sixteen lane bifurcation of a processor with 32 or 64 lanes may be configured based on lanes 0-15 or lanes 16-31, while lanes 8-23 may not be available (e.g., based on bifurcation listings). In some examples, a first processor with 64 lanes may be configured with a combination of ×16, ×8, and/or ×4 bifurcations (e.g., ×16 to one GPU, ×16 to a second processor, ×8 to a first network interface controller (NIC), ×8 to a second NIC, ×4 to four different SSDs, etc.).

In some cases, some bifurcation configurations can result in degradation, or unused lanes. Unused lanes within a bifurcation configuration may be considered lost or wasted.

For example, in some cases, unused lanes cannot be arbitrarily re-assigned unless a new bifurcation is configured (e.g., at next boot). In an example, ×16 lanes of a processor may be bifurcated to a compute express link (CXL) device, where the CXL devices only uses ×8 lanes. As a result, eight lanes are functional, and eight lanes are degraded and idle. In another example, ×4 lanes may be bifurcated to an SSD, where the SSD only uses ×2 lanes. As a result, two lanes are functional, and two lanes are degraded/idle. Such degraded/idle lanes may be viewed as costly configurations because the idle lanes prevent other devices from connecting to the given processor.

Multi-Tenancy (MT), which may be referred to as quality of service (QoS), may be associated with single port drives. MT enables improved and more granular sharing of a storage drive. MT can be extended to multiple ports on the same drive. MT can be extended based on each port supporting multiple physical function (Multi-PF) and/or single root input/output virtualization (SR-IOV).

In some examples, SSDs continue to increase in capacity. In some cases, compute enclosures (e.g., high-performance computing (HPC) enclosures) and/or server enclosures may use relatively small numbers of SSDs with relatively high quality of service (QOS) requirements, while storage enclosures may use relatively large numbers of SSDs. In some examples, compute enclosures and/or server enclosures may use locally attached SSDs within the enclosure like a local storage cache for a larger remote data storage that may be accessed through a network. In some cases, a given enclosure may include a network interface controller (NIC), where the given enclosure may be configured to connect to a remote device via the NIC.

In some examples, PCIe and/or CXL can include a high-speed interface standard for connecting electronic components, such as graphics cards, storage devices, and other peripherals, to a computer's motherboard. PCIe and/or CXL may be used in desktop and mobile computers, as well as server systems, and in other devices such as set-top boxes and gaming consoles, etc. PCIe 6.0 1×4 has a relatively high amount of bandwidth available relative to some storage devices. In some cases, processing capacity of host processors is not increasing at a rate that matches increases in PCIe or CXL bandwidth. In some examples, a host processor may not be capable of fully utilizing a PCIe 6.0 1×4 link based on 4 KB random reads (e.g., too much processing time for turn around). In some cases, host processors may be relatively busy with non-storage tasks. As a result, one dedicated SSD per processor may be increasingly idle. However, providing SSDs with multiple ports (e.g., four port SSDs) enables an SSD to connect to multiple processors, thereby increasing the utilization rate of the SSD.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine.

While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155 (e.g., reference clock, differential reference clock). Timer 155 may be used to synchronize data communication, etc. One or more transmitters may be paired with one or more receivers.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), an optical processing unit (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of machine 105 may be implemented as a system-on-chip (SoC).

In some examples, machine 105 may include any one or combination of logic (e.g., logical circuit), hardware (e.g., processing unit, memory, storage), software, firmware, and the like. In some cases, machine 105 may perform one or more functions in conjunction with processor 110. The one or more logic circuits of machine 105 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable machine 105 to provide multi-port storage functionality.

In one or more examples, machine 105 may include multi-port storage devices (e.g., four port SSDs). In some cases, a storage device may be configured with multiple ports. For example, the storage device may be configured with at least a first port, a second port, a third port, and a fourth port. In some cases, a first connection may be established between a first processing unit and the storage device via the first port, a second connection may be established between a second processing unit and the storage device via the second port, a third connection may be established between a third processing unit and the storage device via the third port, and/or a fourth connection may be established between a fourth processing unit and the storage device via the fourth port. In some examples, one or more data operations may be performed on the storage device based on the first connection, the second connection, the third connection, and/or the fourth connection.

Figure 2:
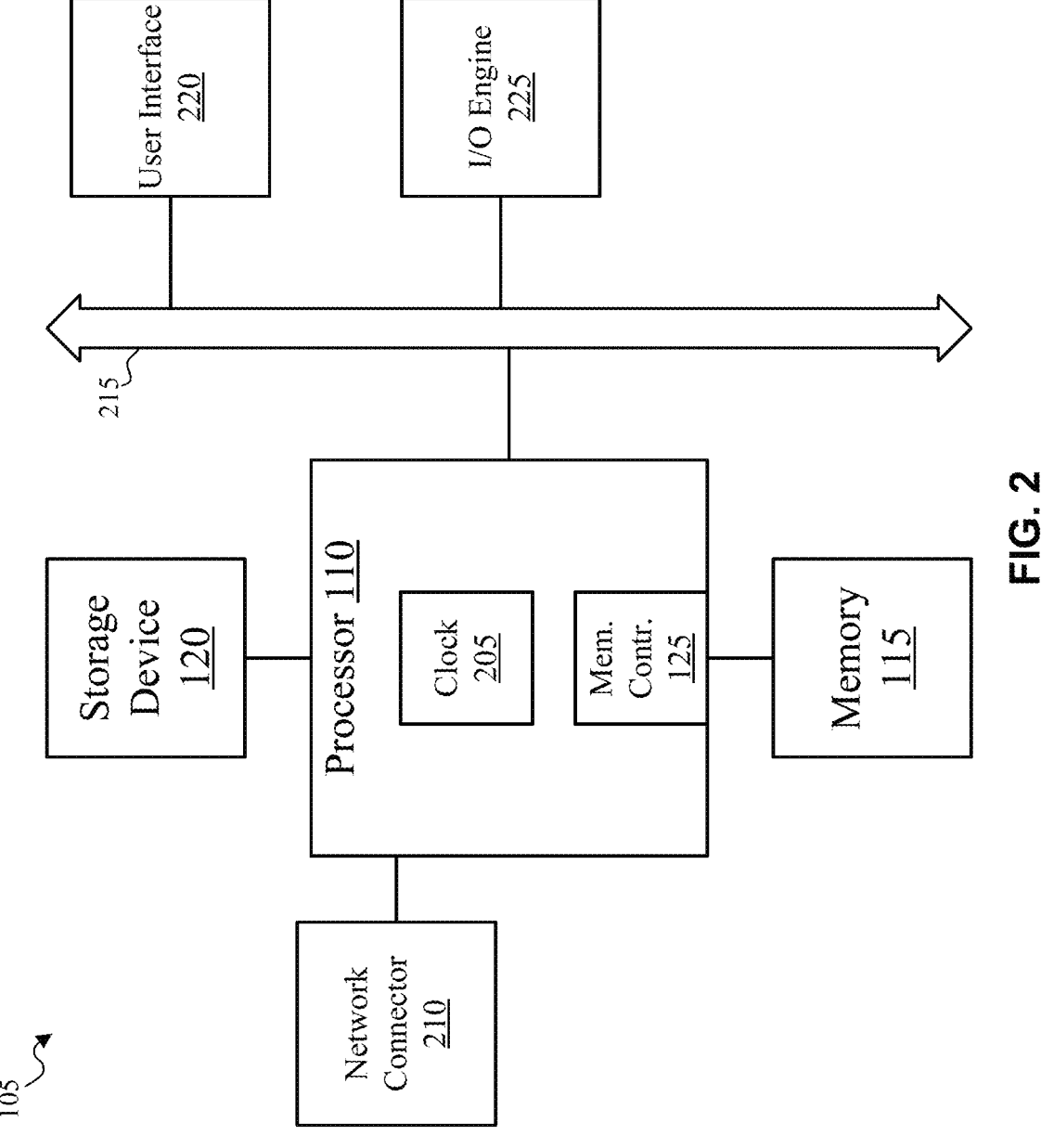
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components.

FIG. 3 illustrates an example system 300 in accordance with one or more implementations as described herein. In the illustrated example, system 300 may include one or more compute enclosures (e.g., compute enclosure 305). As shown, compute enclosure 305 may include one or more storage devices (e.g., SSD 310, SSD 315), one or more processing units (e.g., CPU 320, CPU 330, CPU 340, CPU 350), and/or a NIC (e.g., NIC 365).

In some examples, compute enclosure 305 may be configured for computational functionality. In some cases, system 300 may include a high-performance computing (HPC) system. In some cases, system 300 may include computing resources (e.g., multi-port SSDs, CPUs, memory, etc.) to achieve higher performance than a single computer, workstation, or server. Compute enclosure 305 may provide on-premise computing, cloud computing, multitenancy computing, or a combination thereof.

In some examples, the memory of system 300 (e.g., memory 325, memory 335, memory 345, and/or memory 355) may include high-bandwidth memory (HBM), DRAM, and/or other memory described herein. As shown, memory 325 may connect to CPU 320, memory 335 may connect to CPU 330, memory 345 may connect to CPU 340, and/or memory 355 may connect to CPU 350. Although the processing units of compute enclosure 305 are depicted as CPUs (e.g., CPU 320, CPU 330, CPU 340, CPU 350), the processing units of compute enclosure 305 may include one or more CPUs, one or more GPUs, one or more NPUs, one or more TPUs, one or more ASICs, one or more FPGAs, and/or one or more other processing units described herein.

As shown, a first port of SSD 310 connects to CPU 320, a second port of SSD 310 connects to CPU 330, and a third port of SSD 310 connects to CPU 340. In some cases, a fourth port of SSD 310 may optionally connect to CPU 350. Alternatively, the fourth port of SSD 310 may optionally connect to NIC 365, enabling compute enclosure 305 and/or a component of compute enclosure 305 (e.g., SSD, CPU, memory, etc.) to connect to a remote component external to compute enclosure 305. Alternatively, or alternatively, the fourth port of SSD 315 may optionally connect to NIC 365, enabling compute enclosure 305 and/or a component of compute enclosure 305 (e.g., SSD, CPU, memory, etc.) to connect to a remote component external to compute enclosure 305. In some systems, a NIC may connect to a CPU (e.g., CPU 350). For an SSD in a compute enclosure to be populated with remote data from a different enclosure, the data would go into the NIC, into the CPU, then into the SSD. As shown, NIC 365 may attach to a port of an SSD (e.g., SSD 310 and/or SSD 315). When a NIC connects to an SSD port connection (e.g., NIC 365), the NIC has the ability to bridge (e.g., translate) PCIe to a data center network (e.g., Infiniband, RDMA, TCP, etc.). When a NIC connects to an SSD port connection (e.g., NIC 365), the NIC is enabled to send data to an SSD directly (e.g., without going through a CPU). This direct SSD to NIC connection improves system performance, decreases latency, increases CPU bandwidth.

The systems and methods described can provide backwards compatibility for legacy devices. In some examples, each port can run at a different PCIe Generation (e.g., run at a different speed of data transmission). Lower speeds can lower the power consumed for that port, thereby increasing system efficiency. In some cases, a port may be turned off to save power for that port. Ports can be put in different power savings modes. In some examples, a port may be placed at a power level among multiple power levels and/or power saving states, (e.g., L0, L1, L3, etc., power levels and/or power saving states). Dynamic transitions through power levels may be implemented while a drive is active. In some examples, a host may recognize it does not need the bandwidth of four ports on a given drive (e.g., SSD 310). Therefore, the host may configure the power levels of each port, enabling the host to send commands to the drive through port 0, while ports 1-3 can separately be put into a lower power state or turned off. In some cases, the host may determine it needs more bandwidth. Accordingly, the host may reconfigure at least one of ports 1-3 (e.g., increase port power level, configure an inactive port to a higher power level, configure a port to a full data speed power level). The host may then submit (e.g., simultaneously submit) commands to each of the active ports. When a port is in a lower power state, the host may optionally send a command to the drive through this lower power port. In some cases, because the port is configured in a low power state, the drive may autonomously lower the win rate of commands associated with this port. Accordingly, the lower power port may experience a worse QoS for commands submitted through the lower power port. In some cases, the drive may identify the change in the port's transmission speed and relate this change to internally degrading or upgrading the performance of commands related to that port.

Additionally, or alternatively, a first port of SSD 315 connects to CPU 320, a second port of SSD 315 connects to CPU 330, a third port of SSD 315 connects to CPU 340, and a fourth port of SSD 315 connects to CPU 350. Although depicted with two four-port SSDs, compute enclosure 305 may include more or less SSDs. For example, in some cases, compute enclosure 305 may be configured with four four-port storage devices, sixteen processing units, and sixteen memory units corresponding to the sixteen processing units.

As shown, system 300 may include SSD 360. In some cases, SSD 360 may be another SSD in compute enclosure 305, may be an SSD in another compute enclosure, an SSD in a server, an SSD of an SoC, etc. In some cases, SSD 360 may represent an SSD depicted in compute enclosure 305 (e.g., SSD 310 and/or SSD 315). In the illustrated example, SSD 360 may include at least four ports (e.g., port 365, port 370, port 375, port 380). As shown, each port of SSD 360 may connect to one or more connections pins. The one or more connector pins may include at least a reset connector pin and/or a pair of differential clock connector pins. A given pair of differential clock connector pins may include a positive reference clock connector pin (e.g., RefClk+) and a negative reference clock connector pin (e.g., RefClk−). In some cases, a respective reset connector pin and/or pair of differential clock connector pins may be configured based on a PCIe form factor. In some cases, a given reset connector pin may carry a reset signal that enables a host (e.g., a host of system 300, a CPU of system 300, etc.) to reset a connection of a given port of SSD 360 and/or to reset SSD 360. In some cases, a given pair of differential clock connector pins may be connected to a differential clock oscillator and may be configured to carry an electronic logic signal (e.g., voltage or current) that oscillates between a high and a low state at a constant frequency and that may be used to synchronize communications on a given port of SSD 360. In some cases, a pair of differential clock connector pins may be connected to a differential clock oscillator. In some cases, a pair of differential clock connector pins may carry two complementary signals (e.g., equal in magnitude, but of opposite polarity), where RefClk+ carries a first clock signal of positive polarity and RefClk− carries a first clock signal of negative polarity.

System 300 provides multiple benefits and advantages. In the illustrated example, a clock on port 365 may differ from a clock on port 370, port 375, and/or port 380. In some cases, each depicted clock may include a separate or independent clock signal. The separate clock signals increase accessibility and connectivity of system 300. In some examples, system 300 may be implemented in a multi-tenancy environment. In some cases, a first port (e.g., port 365) may be configured to identify one or more tenants. Accordingly, different tenants may receive different levels of service via the first port in a multi-tenant scenario. In another example, a first port of SSD 310 may be configured as a parent node or in a management role. Based on this configuration, the first port may set the service levels for the other ports of SSD 310. In another example, a first port may be provided high priority on winning resources in contention to support increased bandwidth or lower overall command latency. A second port may be used for loading data in the background or for data center service activities (e.g., checking data integrity and/or updating data center erasure encodings). Based on this configuration, the second port may be configured with a lower win rate for resources in contention to maintain the higher priority of the first port.

Figure 4:
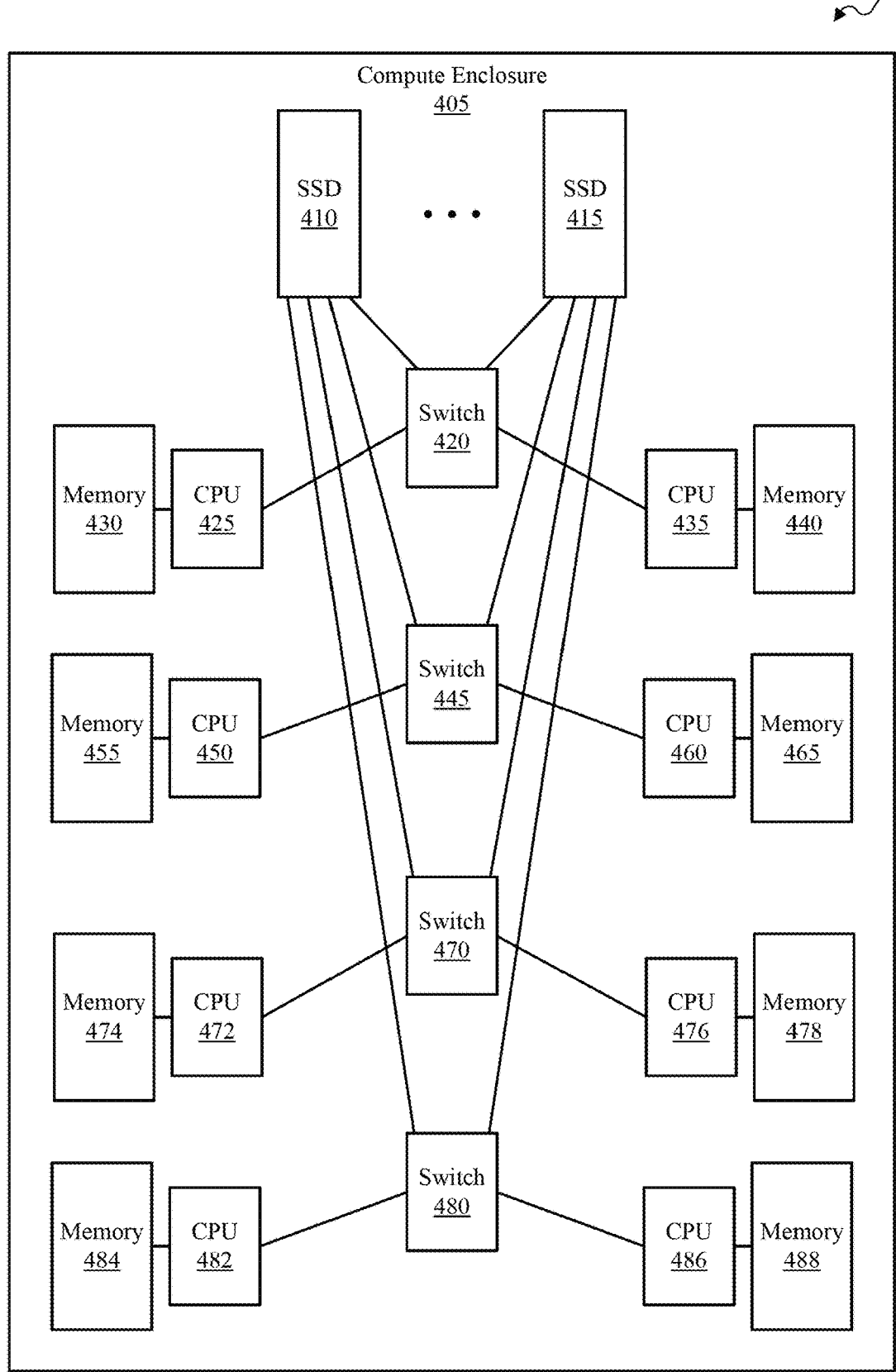
FIG. 4 illustrates an example system in accordance with one or more implementations as described herein.

FIG. 4 illustrates an example system 400 in accordance with one or more implementations as described herein. In the illustrated example, system 400 may include one or more compute enclosures (e.g., compute enclosure 405). As shown, compute enclosure 405 may include one or more storage devices (e.g., SSD 410, SSD 415), one or more processing units (e.g., CPU 425, CPU 435, CPU 450, CPU 460, CPU 472, CPU 476, CPU 482, CPU 486), and/or one or switches (e.g., switch 420, switch 445, switch 470, switch 480).

In some examples, compute enclosure 405 may be configured for computational functionality. In some cases, system 400 may include a high-performance computing (HPC) system. In some cases, system 400 may include computing resources (e.g., multi-port SSDs, CPUs, memory, switches, etc.) to achieve higher performance than a single computer, workstation, or server.

In some examples, the memory of system 400 (e.g., memory 430, memory 440, memory 455, memory 465, memory 474, memory 478, memory 484, memory 488) may include high-bandwidth memory (HBM), DRAM, and/or other memory described herein. As shown, memory 430 may connect to CPU 425, memory 440 may connect to CPU 435, memory 455 may connect to CPU 450, memory 465 may connect to CPU 460, memory 474 may connect to CPU 472, memory 478 may connect to CPU 476, memory 484 may connect to CPU 482, and/or memory 488 may connect to CPU 486. Although the processing units of compute enclosure 405 are depicted as CPUs (e.g., CPU 425, CPU 435, CPU 450, CPU 460), the processing units of compute enclosure 405 may include one or more CPUs, one or more GPUs, one or more NPUs, one or more TPUs, one or more ASICs, one or more FPGAs, and/or one or more other processing units described herein.

As shown, a first port of SSD 410 connects to switch 480, a second port of SSD 410 connects to switch 470, a third port of SSD 410 connects to switch 445, and a fourth port of SSD 410 connects to switch 420. Additionally, or alternatively, a first port of SSD 415 connects to switch 420, a second port of SSD 415 connects to switch 445, a third port of SSD 415 connects to switch 470, and a fourth port of SSD 415 connects to switch 480. Although depicted with two four-port SSDs, compute enclosure 405 may include more or less SSDs. For example, in some cases, compute enclosure 405 may be configured with more or less multi-port storage devices than depicted (e.g., four four-port storage devices), more or less switches, more or less processing units, and more or less memory units corresponding to the processing units. In some cases, compute enclosure 405 configured with four SSDs operating in conjunction with each other allows data and erasure codes spread across the SSDs for latency smoothing.

In the illustrated example, switch 420 connects CPU 425 and CPU 435, switch 445 connects to CPU 450 and CPU 460, switch 470 connects to CPU 472 and 476, and switch 480 connects to CPU 482 and CPU 486. Accordingly, CPU 425 and/or CPU 435 may access SSD 410 and/or SSD 415 via switch 420, CPU 450 and/or CPU 460 may access SSD 410 and/or SSD 415 via switch 445, and so forth. As shown, compute enclosure 405 is configured to provide one hop between SSD 410 and a given CPU of compute enclosure 405, provide one hop between SSD 415 and a given CPU of compute enclosure 405, etc.

In some examples, CPUs of compute enclosure 405 may be configured for mastering and/or coordinating (e.g., see FIG. 8). As shown, the configuration of compute enclosure 405 with multiple multi-port SSDs, switches, CPUs, and memory enables single hop connections between SSDs and CPUs (e.g., single hop between SSD 415 and CPU 450, etc.). The configuration of compute enclosure 405 reduces system costs while improving the availability and usage rate of SSDs of compute enclosure 405.

Figure 5:
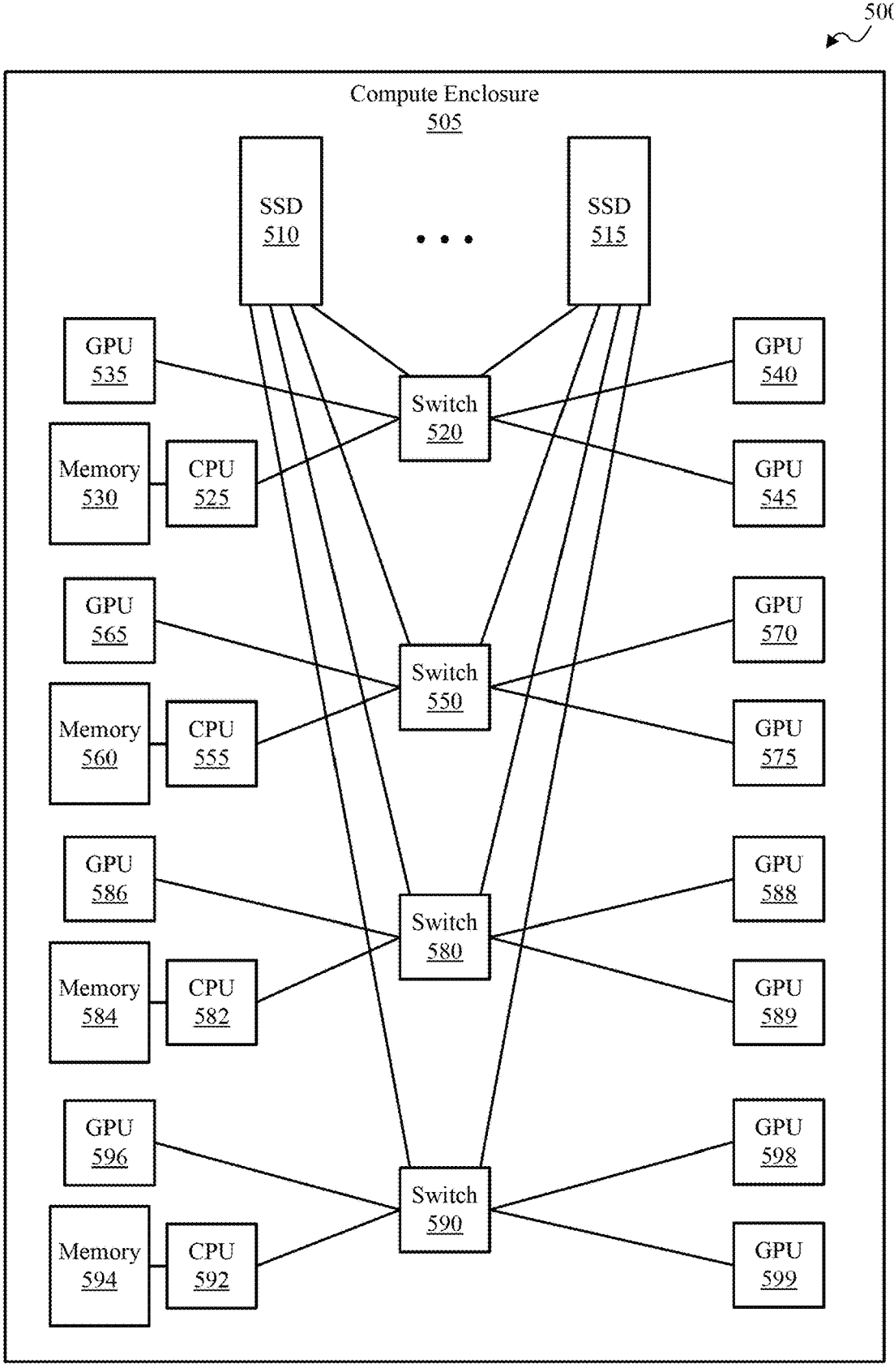
FIG. 5 illustrates an example system in accordance with one or more implementations as described herein.

FIG. 5 illustrates an example system 500 in accordance with one or more implementations as described herein. In the illustrated example, system 500 may include one or more compute enclosures (e.g., compute enclosure 505). As shown, compute enclosure 505 may include one or more storage devices (e.g., SSD 510, SSD 515), one or more processing units (e.g., CPU 525, GPU 535, GPU 540, GPU 545, CPU 555, GPU 565, GPU 570, GPU 575, CPU 582, GPU 586, GPU 588, GPU 589, CPU 592, GPU 596, GPU 598, GPU 599), and/or one or switches (e.g., switch 520, switch 550, switch 580, switch 590).

In some examples, compute enclosure 505 may be configured for computational functionality. In some cases, system 500 may include a high-performance computing (HPC) system. In some cases, system 500 may include computing resources (e.g., multi-port SSDs, CPUs, GPUs, memory, switches, etc.) to achieve higher performance than a single computer, workstation, or server.

In some examples, the memory of system 500 (e.g., memory 530 and/or memory 560) may include high-bandwidth memory (HBM), DRAM, and/or other memory described herein. As shown, memory 530 may connect to CPU 525, and memory 560 may connect to CPU 555. Although the processing units of compute enclosure 505 are depicted as CPUs and GPUs, the processing units of compute enclosure 505 may include one or more CPUs, one or more GPUs, one or more NPUs, one or more TPUs, one or more ASICs, one or more FPGAs, and/or one or more other processing units described herein. Although compute enclosure 505 is depicted with a given number of memory units (e.g., memory 530, memory 560, memory 584, memory 594), enclosure 505 may include less or more memory units. In some cases, one or more memory units may connect to at least one GPU of compute enclosure 505 (e.g., a memory unit connected to GPU 540, HBM connected to GPU 545, etc.).

In the illustrated example, a first port of SSD 510 connects to switch 590, a second port of SSD 510 connects to switch 580, a third port of SSD 510 connects to switch 550, and a fourth port of SSD 510 connects to switch 520. Additionally, or alternatively, a first port of SSD 515 connects to switch 520, a second port of SSD 515 connects to switch 550, a third port of SSD 515 connects to switch 580, and a fourth port of SSD 515 connects to switch 590. Although depicted with two four-port SSDs, compute enclosure 505 may include more or less SSDs. For example, in some cases, compute enclosure 505 may be configured with more or less multi-port storage devices than depicted (e.g., four four-port storage devices), more or less switches, one or more processing units connected to at least one of the switches, and one or more memory units corresponding to at least one of the processing units.

In the illustrated example, switch 520 connects to CPU 525, GPU 535, GPU 540, and GPU 545, while switch 550 connects to CPU 555, GPU 565, GPU 570, and GPU 575. Accordingly, CPU 525, GPU 535, GPU 540, and GPU 545 may access SSD 510 and/or SSD 515 via switch 520. Additionally, or alternatively, CPU 555, GPU 565, GPU 570, and GPU 575 may access SSD 510 and/or SSD 515 via switch 550. As shown, CPU 582, GPU 586, GPU 588, and/or GPU 589 may access SSD 510 and/or SSD 515 via switch 580. As shown, CPU 592, GPU 596, GPU 598, and/or GPU 599 may access SSD 510 and/or SSD 515 via switch 590. Accordingly, compute enclosure 505 is configured to provide one hop between SSD 510 and a given CPU or GPU of compute enclosure 505 and/or to provide one hop between SSD 515 and a given CPU or GPU of compute enclosure 505.

In some examples, the SSDs of compute enclosure 505 may be configured to provide caching for relatively large levels of storage (e.g., relatively large size of individual SSDs and/or relatively large number of SSDs in compute enclosure 505). The configuration of compute enclosure 505 with multi-port SSDs enables relatively large capacity drives (e.g., SSD 510, SSD 515, etc.) to improve sharing and storage access among a relatively large number of processing units such as a complex of CPUs, GPUs, TPUs, NPUs, OPUs, etc., in a given enclosure (e.g., compute enclosure 505). In some cases, the SSDs of compute enclosure 505 may be hot-swappable, enabling SSDs to be added to and/or removed from compute enclosure 505 based on demand. Additionally, or alternatively, switches, memory, and/or processing units may be added to and/or removed from compute enclosure 505 based on demand.

FIG. 6 depicts a flow diagram illustrating an example method 600 associated with the disclosed systems, in accordance with example implementations described herein. In some configurations, method 600 may be implemented by machine 105 of FIG. 1, machine 105 of FIG. 2, one or more components of system 300 of FIG. 3, one or more components of system 400 of FIG. 4, and/or one or more components of system 500 of FIG. 5. In some configurations, method 600 may be implemented in conjunction with machine 105, components of machine 105, or any combination thereof. The depicted method 600 is just one implementation and one or more operations of method 600 may be rearranged, reordered, omitted, and/or otherwise modified such that other implementations are possible and contemplated.

At 605, method 600 may include a storage device with multiple ports comprising at least a first port, a second port, and a third port. For example, SSD 310 may include multiple ports that include at least a first port, a second port, and a third port.

At 610, method 600 may include establishing a first connection between a first processing unit and the storage device via the third port that is different from a second connection to the storage device via the first port or a third connection to the storage device via the second port. For example, CPU 320 and SSD 310 may perform a communication protocol (e.g., NVMe protocol, PCIe protocol) to establish a first connection via the third port of SSD 310, which is different from a second connection to SSD 310 via the first port or a third connection to SSD 310 via the second port.

At 615, method 600 may include performing a data operation on the storage device based on the first connection. For example, SSD 310 may perform a data operation based on the first connection to CPU 320 (e.g., based on a command from CPU 320). The data operation may include at least one of a read access, write access, modify access, copy access, deallocation access, or garbage collection access. A read access reads data from SSD 310. A write access writes data to SSD 310. A copy access copies data from SSD 310 to another storage device. A deallocation access deallocates storage space in SSD 310. Garbage collection access copies data at a first block of SSD 310 still in use to a second block of SSD 310, and then deletes the data from the first block.

Method 600 provides a low latency computing architecture that increases the connectivity of a given storage device (e.g., solid-state drive (SSD)) for improved connectivity. Additionally, method 600 minimizes or remove the need for network adapters, switches, relays, and/or repeaters, improving system functionality and system efficiency.

FIG. 7 depicts a flow diagram illustrating an example method 700 associated with the disclosed systems, in accordance with example implementations described herein. In some configurations, method 700 may be implemented by machine 105 of FIG. 1, machine 105 of FIG. 2, one or more components of system 300 of FIG. 3, one or more components of system 400 of FIG. 4, and/or one or more components of system 500 of FIG. 5. In some configurations, method 700 may be implemented in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include a storage device with multiple ports comprising at least a first port, a second port, and a third port. For example, SSD 310 may include multiple ports that include at least a first port, a second port, and a third port.

At 710, method 700 may include establishing a first connection between a first processing unit and the storage device via the third port that is different from a second connection to the storage device via the first port or a third connection to the storage device via the second port. For example, establishing a first connection between a CPU 320 and SSD 310 via the third port of SSD 310, which is different from a second connection to SSD 310 via the first port or a third connection to SSD 310 via the second port.

At 715, method 700 may include establishing a reference clock of the first connection based on a differential clock signal. For example, SSD 310 may establish a reference clock of the first connection based on a differential clock signal. In some cases, each port of SSD 310 may include a connection to a reset connector pin and a connection to a pair of differential clock connector pins. In some examples, the respective reset connector pin and the pair of differential clock connector pins of each port of SSD 310 may be configured based on a peripheral component interconnect express (PCIe) form factor. In some cases, establishing a reference clock may be associated with establishing a PCIe connection. In some aspects, establishing a connection at a port of an SSD may include detecting or setting values on a variety of different pins. In some cases, the pins may vary per form factor and the pin meanings may have time requirements on their value transitions. Detecting presence (e.g., of a connected device) on a port may include checking or setting a presence pin voltage, enterprise PCIe Reset (ePERST) voltage, impedance of one or more pins, the ability to raise and/or lower a voltage on a pin with a nominal applied current to detect if the line is actively held to a voltage or if it drifted to that voltage, etc.

At 720, method 700 may include performing a data operation on the storage device based on the first connection. For example, SSD 310 may perform a data operation based on the first connection to CPU 320 (e.g., based on a command from CPU 320).

FIG. 8 depicts a flow diagram illustrating an example method 800 associated with the disclosed systems, in accordance with example implementations described herein. In some configurations, method 800 may be implemented by machine 105 of FIG. 1, machine 105 of FIG. 2, one or more components of system 300 of FIG. 3, one or more components of system 400 of FIG. 4, and/or one or more components of system 500 of FIG. 5. In some configurations, method 800 may be implemented in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include determining work to be done. For example, CPU 525 may determine the work to be done. In some cases, CPU 525 may receive a number of tasks to complete by CPU 525 and/or via delegation by CPU 525. In some examples, CPU 525 determines the capabilities of the different components. CPU 525 determines how to break up the work and how to distribute it to connected components.

At 810, method 800 may include requesting data associated with the work. For example, CPU 525 may send data requests to a host (e.g., data center) requesting the loading of the data to be processed. In some cases, a data center (e.g., system 300, system 400, system 500) may include one or more compute enclosures such as compute enclosure 505.

At 815, method 800 may include loading the requested data into a local SSD. For example, CPU 525 loads the requested data into a local SSD (e.g., SSD 515). In some examples, CPU 525 may perform pre-processing of the data. For example, CPU 525 may remove NaNs (not a number) from a given data set before processing the data or before assigning processing of the data.

At 820, method 800 may include assigning the processing of the data. For example, CPU 525 may determine the data is loaded and command GPU 535 to do one or more tasks included in the work. In some examples, CPU 525 may assign task X on dataset Y on SSD 515 to GPU 535. In some cases, CPU 525 may assign at least a portion of the work to itself (e.g., CPU 525 may process at least one task of the work). Based on a received task, GPU 535 may read Y or portions of Y into itself. In some cases, GPU 535 may perform one or more read operations to fetch the data in SSD 515 to process the assigned tasks associated with the data. In some cases, as GPU 535 performs an assigned task, GPU 535 may write processing results, data modifications, etc., to SSD 515.

At 825, method 800 may include receiving a task completed message. For example, when GPU 535 completes the assigned work, GPU 535 may inform CPU 525 the assigned work is completed. In some cases, CPU 525 can be doing one or more operations of method 800 in parallel with multiple GPUs (e.g., GPU 535, GPU 540, GPU 545, etc.). In some cases, upon receiving the work completed message from GPU 535, CPU 525 may assign a new task to GPU 535.

At 830, method 800 may include sending a work completed message. For example, when CPU 525 determines that all the tasks of the given number of tasks (e.g., all the work) are completed, CPU 525 may send a message to a host or data center indicating that the assigned number of tasks are completed.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices.

Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. More-over, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method comprising:
configuring a storage device with at least a first port, a second port, and a third port;
establishing a first connection between a first processing unit and the storage device via the third port that is different from a second connection to the storage device via the first port or a third connection to the storage device via the second port;
performing a data operation on the storage device based on the first connection;
maintaining a first quality of service for a first tenant of the first connection different from a second quality of service for a second tenant of the second connection; and
rerouting traffic associated with the first port to at least the second port or the third port based on detecting a failure at the first port, wherein the data operation is transferred to the second port or the third port based on the rerouting.

2. The method of claim 1, wherein rerouting the traffic includes spreading at least a portion of the traffic across the second port and the third port.

3. The method of claim 1, further comprising maintaining the first quality of service of the first connection on at least the second port or the third port based on rerouting the traffic associated with the first port to at least the second port or the third port.

4. The method of claim 1, wherein:
the first port connects to a first reset connector pin and a first pair of differential clock connector pins,
the second port connects to a second reset connector pin and a second pair of differential clock connector pins, and
the third port connects to a third reset connector pin and a third pair of differential clock connector pins.

5. The method of claim 4, wherein the first reset connector pin and the pair of differential clock connector pins are configured based on a peripheral component interconnect express form factor.

6. The method of claim 1, wherein:
the third port of the storage device is communicatively coupled to a first switch, and
the first switch is communicatively coupled to the first processing unit.

7. The method of claim 6, wherein the first switch is communicatively coupled to a second processing unit.

8. The method of claim 7, wherein the first processing unit is a first type of processing unit and the second processing unit is a second type of processing unit.

9. The method of claim 8, wherein the first type of processing unit includes a central processing unit and the second type of processing unit includes a graphical processing unit.

10. The method of claim 9, wherein the first switch connects to a graphical processing unit cluster, the graphical processing unit cluster including the graphical processing unit.

11. The method of claim 6, wherein the first switch comprises a transmission control protocol/internet protocol (TCP/IP) switch.

12. The method of claim 6, wherein the first port is communicatively coupled to a second switch and the second port is communicatively coupled to a third switch.

13. The method of claim 12, wherein the first switch, the second switch, and the third switch are in an enclosure with the storage device.

14. The method of claim 1, further comprising performing a communication protocol to establish a fourth connection that initiates at a fourth port and terminates at a fourth processing unit.

15. The method of claim 14, wherein the fourth port is configured as a failover port for at least one of the first port, the second port, or the third port based on a failure detected with at least one of the first port, the second port, or the third port.

16. The method of claim 1, wherein the data operation includes at least one of read access, write access, modify access, copy access, deallocation access, or garbage collection access.

28

17. A storage device comprising:
at least a first port, a second port, and a third port, the storage device being configured to:
establish a first connection between a first processing unit and the storage device via the third port that is different from a second connection to the storage device via the first port or a third connection to the storage device via the second port;
perform a data operation on the storage device based on the first connection;
maintain a first quality of service for a first tenant of the first connection different from a second quality of service for a second tenant of the second connection; and
reroute traffic associated with the first port to at least the second port or the third port based on detecting a failure at the first port, wherein the data operation is transferred to the second port or the third port based on the rerouting.

18. The storage device of claim 17, wherein rerouting the traffic includes spreading at least a portion of the traffic across the second port and the third port.

19. A non-transitory computer-readable medium storing code that comprises instructions executable by a processor of a storage device with at least a first port, a second port, and a third port, the instructions executable by the processor to:
establish a first connection between a first processing unit and the storage device via the third port that is different from a second connection to the storage device via the first port or a third connection to the storage device via the second port;
perform a data operation on the storage device based on the first connection;
maintain a first quality of service for a first tenant of the first connection different from a second quality of service for a second tenant of the second connection; and
reroute traffic associated with the first port to at least the second port or the third port based on detecting a failure at the first port, wherein the data operation is transferred to the second port or the third port based on the rerouting.

20. The non-transitory computer-readable medium of claim 19, wherein rerouting the traffic includes spreading at least a portion of the traffic across the second port and the third port.

* * * * *